J. H. SKOGMAN.
EMERGENCY TIRE FOR AUTOMOBILES.
APPLICATION FILED OCT. 27, 1920.
1,400,915.
Patented Dec. 20, 1921.
2 SHEETS—SHEET 1.
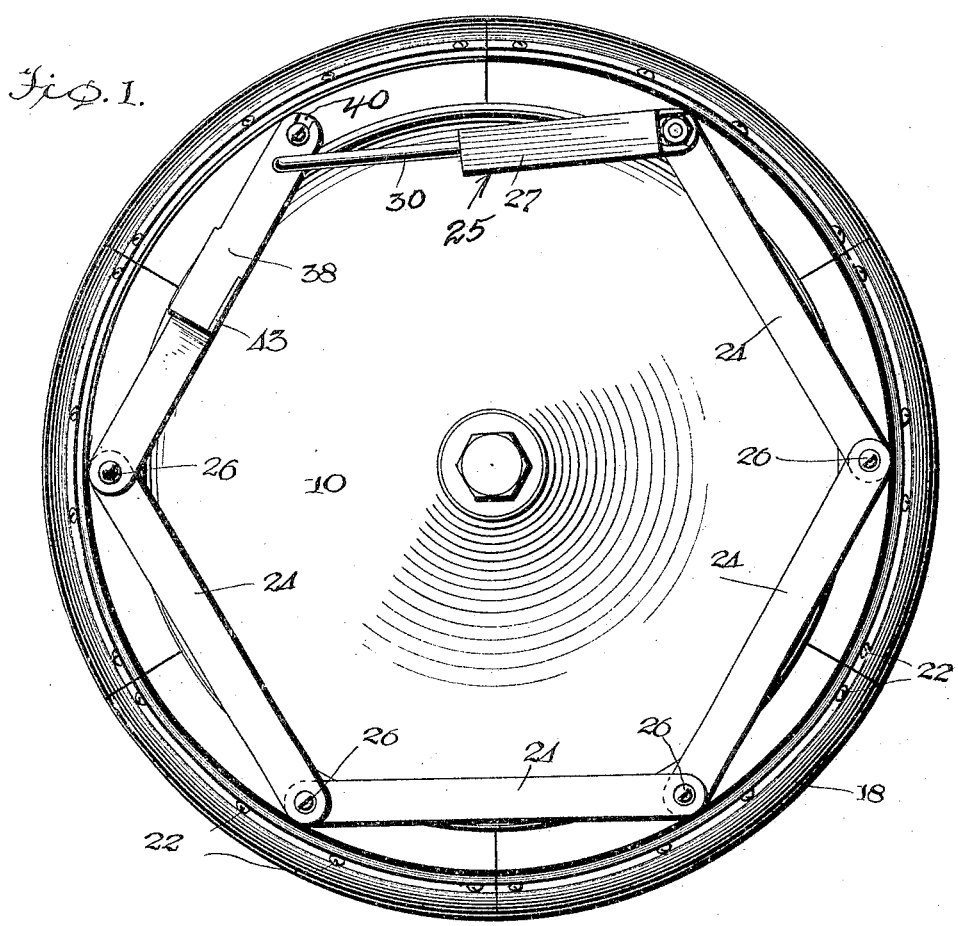
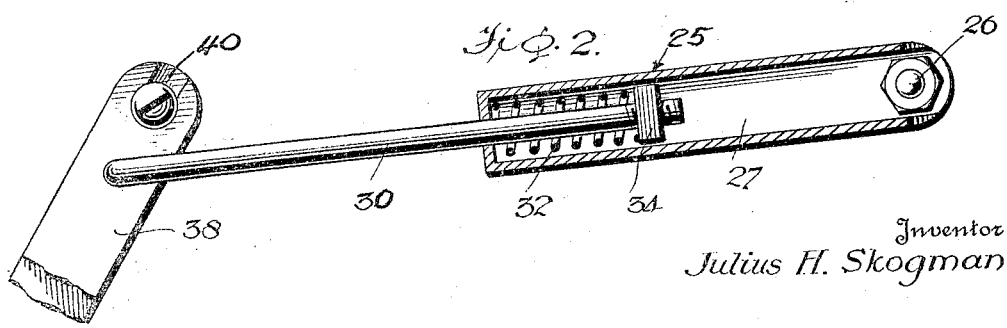
Inventor
Julius H. Skogman,
By
Attorney

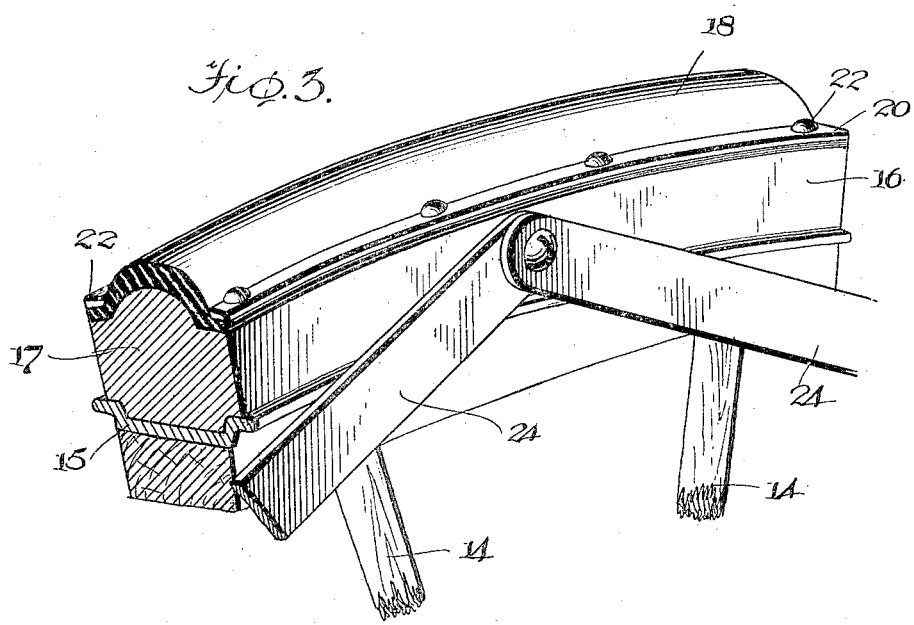
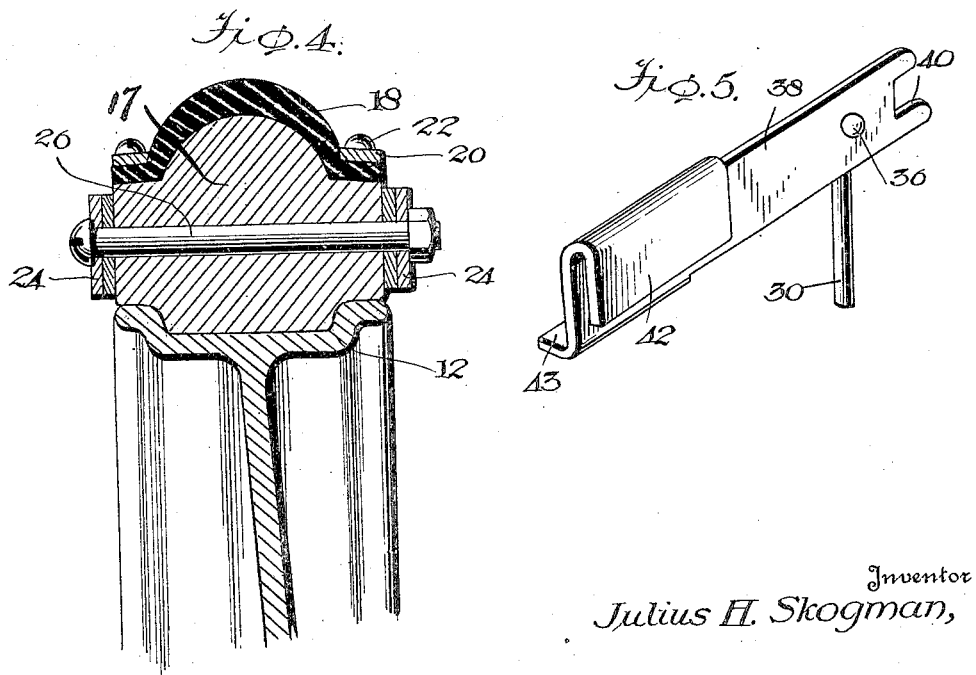

UNITED STATES PATENT OFFICE.

JULIUS HUGO SKOGMAN, OF JOPLIN, MISSOURI.

EMERGENCY-TIRE FOR AUTOMOBILES.

1,400,915.  Specification of Letters Patent.  Patented Dec. 20, 1921.

Application filed October 27, 1920. Serial No. 419,852.

*To all whom it may concern:*

Be it known that I, JULIUS HUGO SKOGMAN, a citizen of the United States, and a resident of Joplin, in the county of Jasper and State of Missouri, have invented certain new and useful Improvements in Emergency-Tires for Automobiles, of which the following is a specification.

This invention relates to emergency tires particularly adapted for use in connection with vehicle wheels.

An important object of this invention is to provide an emergency tire for vehicles which is capable of ready attachment to a vehicle wheel for the purpose of displacing the original tire should the same become punctured while on the road.

A further object of the invention is to provide an emergency tire for vehicles which, when not in use, may be compactly folded and carried in one of the storage compartments of the vehicle.

A further object of the invention is to provide an emergency tire having novel means whereby the same may be detachably secured on the wheel in such a manner that its loss is prevented.

A further object of the invention is to provide an emergency tire for motor vehicles which is of highly simplified construction, efficient in use and cheap to manufacture.

Other objects and advantages of the invention will be apparent during the course of the following description.

In the accompanying drawings forming a part of this application, and in which like numerals are employed to designate like parts throughout the same, Figure 1 is a side elevation of the improved emergency tire applied, Fig. 2 is a detail sectional view through the locking means for the same, Fig. 3 is a fragmentary perspective view of the improved emergency tire to a slightly modified form of wheel, Fig. 4 is a detail sectional view through the tire applied, Fig. 5 is a perspective of a locking arm embodied in the invention.

In the drawings, wherein for the purpose of illustration is shown a preferred embodiment of the invention, the numeral 10 designates a solid wheel having the usual axle-receiving means. Figs. 1 and 4 illustrate the invention as applied to a solid wheel provided with a flange or rim 12 about which the emergency tire is adapted to be arranged. However, it is unnecessary that the improved tire be applied to a solid wheel and the same may be applied to the usual spoked wheel illustrated in Fig. 3 and designated by the numeral 14. In the wheel illustrated in Fig. 3 the same is provided with a rim 15 about which the emergency tire is adapted to be arranged.

The improved emergency tire forming the subject matter of this application comprises a plurality of arcuate sections 16 which are preferably wood, though not necessarily of that material. With reference to Figs. 3 and 4, it will be observed that the outer side of each arcuate section is provided with a crown 17 over which a flexible tread element 18 is arranged. The edge portions of the flexible tread element 18 are secured to the sections 16 on opposite sides of the crown 17 by means of retaining strips 20. The retaining strips are held in position by means of fastening devices 22 which may be of any desired type.

The arcuate sections 16 are connected intermediate their ends through the medium of links 24 which are arranged on opposite sides of the sections. Pivot elements 26 carried by the intermediate portions of the arcuate sections 16 extend through the adjacent ends of the links 24 and permit of movement of the links 24 with relation to the sections 16.

The links 24 extend inwardly of the rim 12 and are arranged on opposite sides of the rim so that lateral movement of the emergency tire with relation to the wheel is prevented. In this manner, the loss of the tire during the travel of the vehicle is prevented. When applied to a wheel the tire is of course arranged in annular formation and is secured in that position or formation by means of a locking device generally designated by the numeral 25. The locking device 25 comprises a barrel 27 having its rear end portion connected to one of the end sections of the tire by means of one of the pivot elements 26. Of course there is one locking barrel 27 arranged on each side of the wheel. A plunger 30 is slidable in the barrel 27 and is surrounded by a coil spring 32 which contacts with one end of the barrel and with a head 34 carried by a plunger.

The spring 32 serves to normally urge the plunger 30 into the barrel whereby the same is retracted.

The forward portion of the plunger is extended laterally as indicated at 36 and is extended through the rear portion of a locking arm 38. The rear end portion of the locking arm 38 is, as illustrated in Fig. 5, formed with a slot 40 adapted for the reception of the pivot element 26 of the other end section 16. The forward portion of each locking arm 38 is formed with a flange 42 which defines a socket adapted for the reception of the intermediate portion of the adjacent link 24.

In applying the improved emergency tire, the arcuate sections 16 are arranged about the rim of the wheel and the pair of plungers 30 are advanced against the tension of the coil springs 32 so that the rear portions of the locking arm 38 may be connected with the adjacent section 16. When the pivot element 26 has been received within the slots 40, the locking arms 38 are moved downwardly into engagement with the intermediate portions of the links 24. In this manner, the locking arms 38 are securely though detachably connected to the adjacent links 24.

When it is desired to detach the emergency tire, the locking arms 38 may be swung to an elevated position against the tension of the coil springs 32 by manually gripping a laterally projecting ear 43 formed at the forward portion of each arm 38.

When the improved tire is not in use, the same may be compactly folded in one of the compartments of a vehicle so as not to occupy much space. The device may be readily attached or detached without the exercise of unusual skill. When applied, the improved tire is absolutely prevented from accidental loss since the same is held against lateral movement by the contact of the links 24 with the sides of the wheel rim and also the rim 15 holds the tire against lateral movement. The connection between the locking devices 25 and the links is such that the ends of the tire are constantly held together so that by no possibility will the loss of the attachment occur.

Having thus described my invention, what I claim is:—

1. A tire for wheels comprising an annular series of sections, spaced links having their end portions overlapped and pivotally connected to the intermediate portions of the sections and engaging one side of the wheel, and means carried by the sections and engaging the other side of the wheel to coöperate with said spaced links for holding the sections on the wheel.

2. An emergency tire comprising sections, pairs of links having their end portions overlapped and connected to the intermediate portions of said sections, and means whereby said sections may be locked in position.

3. An emergency tire comprising a plurality of sections, links having their ends overlapped and pivotally connected to the intermediate portions of said sections and adapted for engagement with the sides of the wheel to which the tire is attached, and means whereby said sections may be locked in position.

4. An emergency tire comprising a plurality of sections, pairs of links having their ends overlapped and pivotally connected to the intermediate portions of said sections, means whereby said sections may be locked in position, and a tread element secured to said sections.

5. An emergency tire for vehicles comprising a plurality of sections, pairs of straight links connected to the intermediate portions of said sections, and means whereby said sections may be locked in position, said means comprising spring actuated plungers and levers connected to said plungers and adapted for engagement with the adjacent links.

6. A tire comprising a split annular body, a barrel connected to said body adjacent one end of the same, a spring actuated plunger associated with said barrel, and a locking arm pivoted to said plunger and detachably connected to the body adjacent the other end of the same.

7. An emergency tire for vehicles comprising sections, links arranged on opposite sides of said sections and adapted for securing the sections in position, pivot elements extending through said sections and connected to said links, spring actuated plungers connected to one of said pivot elements, locking arms pivotally carried by said plungers and having sockets adapted for the reception of the adjacent links, and a tread element for the tire.

JULIUS HUGO SKOGMAN.